United States Patent [19]

Monson

[11] Patent Number: 5,453,043

[45] Date of Patent: Sep. 26, 1995

[54] PELVIC SPLITTER DEVICE AND METHOD OF USE THEREOF

[76] Inventor: Keith W. Monson, Rte. 2, Box 99, Cooperstown, N. Dak. 58425

[21] Appl. No.: 222,229

[22] Filed: Apr. 4, 1994

[51] Int. Cl.⁶ ........................................................ A22B 5/20
[52] U.S. Cl. ..................... 452/160; 30/162; 30/277
[58] Field of Search ................ 452/160; 30/277, 30/280, 294, 317, 314, 335, 272.1, 162

[56] References Cited

U.S. PATENT DOCUMENTS

| | | | |
|---|---|---|---|
| 470,777 | 3/1892 | Billings | 30/162 |
| 871,416 | 11/1907 | Kleemann | 30/162 |
| 1,521,084 | 12/1924 | Eliasherich | 30/162 |
| 3,348,429 | 5/1944 | Walker | 30/162 |
| 4,198,751 | 4/1980 | Egbert | 30/317 |
| 4,682,417 | 7/1987 | Henslin et al. | 30/294 |

FOREIGN PATENT DOCUMENTS

| | | | |
|---|---|---|---|
| 148888 | 2/1955 | Sweden | 30/317 |

*Primary Examiner*—Willis Little
*Attorney, Agent, or Firm*—David A. Lingbeck

[57] ABSTRACT

This invention relates to a pelvic splitter device and method of use thereof used primarily by hunters to split the pelvis of a large game animal during the gutting and cleaning of the animal. The pelvic splitter device comprises a shaft having a hook member and a knife edge at one end thereof and further comprises an impact and handle means having two longitudinal half bodies having mirrored sides with grooves, longitudinal recesses, and recessed portions therein to receive the shaft. The impact and handle means slides upon the shaft and functions, in addition to storing the shaft when not in use, as a slide hammer to impact the rearward end of the shaft to urge the hook member and knife edge through and split the pelvis of the game animal such as a deer.

10 Claims, 5 Drawing Sheets

PELVIC SPLITTER DEVICE AND METHOD OF USE THEREOF

BACKGROUND OF THE INVENTION

This invention relates to a pelvic splitter device and method of use thereof used primarily to break the pelvis of large game animals such as deer to facilitate the cleaning and gutting of such animals without puncturing the bladders and urethras of such animals which would expose the meat of the animals to their fecal waste.

Hunters of large game animals have typically used knives of various lengths and sizes to gut and clean their game. However, while they have done so, often the hunters have accidentally punctured the bladders and urethras of their game thus effecting drainage of the fecal waste from the bladders which have contaminated the meat of the game. The prior art does not describe tools or instruments capable of being safely and conveniently carried by the users for gutting and cleaning large game animals and without puncturing the bladders and urethras of such animals.

One known prior art is a VETERINARY SURGICAL TOOL FOR ENLARGING THE PELVIC GIRDLE OF A HEIFER DURING PARTURITION, U.S. Pat. No. 3,834,393, comprising an elongated shank having a hook-shaped section at a forward end and an abutment flange at a rearward end and further comprising a slidable impact weight mounted about the shaft, the hook-shaped section of the shaft including a rearwardly facing, angularly projecting knife edge and a forwardly projecting blunt point.

Another known prior art is an EVISCERATING AND SURVIVAL TOOL, U.S. Pat. No. 4,528,751, comprising a shaft with a handle at one end, a claw-like hook at the other end, the hook being comprised of at least two arcuately shaped tines defining a slot, and a saw blade disposed longitudinally along a portion of the shaft near the end containing the hook.

Another known prior art is a METHOD AND DEVICE FOR SEPARATING SKELETON PARTS FROM A CARCASS, U.S. Pat. No. 4,985,963, comprising a conveyor, a first meat hook provided on an overhead conveyor for transporting the carcass, a second meat hook attached to a part of the carcass to be separated, and an arm for pressing the carcass in the moving direction of the conveyor away from the second meat hook for separating the carcass.

Another known prior art is an EVISCERATING AND SURVIVAL TOOL, U.S. Pat. No. 4,461,080, comprising a shaft with a handle at one end, a claw-like hook at the other end, the hook being comprised of at least two arcuately shaped tines defining a slot, and a saw blade disposed longitudinally along the portion of the shaft near the end containing the hook.

Of the prior art described herein, only the VETERINARY SURGICAL TOOL is designed to effectively section the pelvic girdle of an animal. However, because of the elongate shaft and the exposed hook-shaped end and knife, the VETERINARY SURGICAL TOOL would not be an effective tool for the hunter who would probably carry the tool on hunting trips because the hunter could cut or injury himself if the tool is being carried on his person. There is a definite need for a pelvic splitter which can be safely and conveniently carried by the hunter to clean and gut large game animals such as deer.

SUMMARY OF THE INVENTION

The present invention relates to a pelvic splitter device which can be safely and conveniently carried on the person of the user and which comprises a shaft having a hook member at a forward end and a transverse hole therethrough near the rearward end, the hook member having a knife edge for splitting through the pelvic bone of a game animal. A slidable impact and handle means having a pair of longitudinal half means having mirrored sides which are fastenable to one another to form said impact and handle means is slidably mounted about said shaft. The mirrored sides of the two half bodies have each a longitudinal recess which extends the length of the half body and which, when the two half bodies are fastened to one another, defines a bore through which the shaft extends and slides. The mirrored sides also have each a longitudinal groove coaxially extending in the longitudinal recess and dimensioned to slidably receive a retainer which, when the two halves are fastened together, holds the impact and handle means on the shaft. The mirrored sides further have each a recessed portion at the front end thereof, the recessed portion being dimensioned to receive the hook member when the two half bodies are fastened together. The impact and handle means functions as a slide hammer to urge the knife edge of the shaft through the pelvic bone of the animal. The impact and handle means also functions to store the shaft and hook member so that the user can safely and conveniently carry the pelvic splitter device on his person while hunting, in particular.

One objective of the present invention is to provide a pelvic splitter device which can be safely carried either in a or on the person of the user without the user having to fear being cut or injured unlike the prior art.

Another objective of the present invention is to provide a pelvic splitter device of which the knife edge can be retracted entirely within the impact and handle means when not in use so as to substantially prevent injury to anyone coming into contact with the splitter device.

Also, another objective of the present invention is to provide a pelvic splitter device which allows the user to angle the knife edge by turning the impact and handle means.

Yet, another objective of the present invention is to provide a pelvic splitter device which allows the user to replace the shaft without having to replace the entire splitter device.

Further objects and advantages of the present invention will become more apparent as the description proceeds and when taken in conjunction with the accompanying drawings wherein:

DETAILED DESCRIPTION OF THE INVENTION

Figure 1:
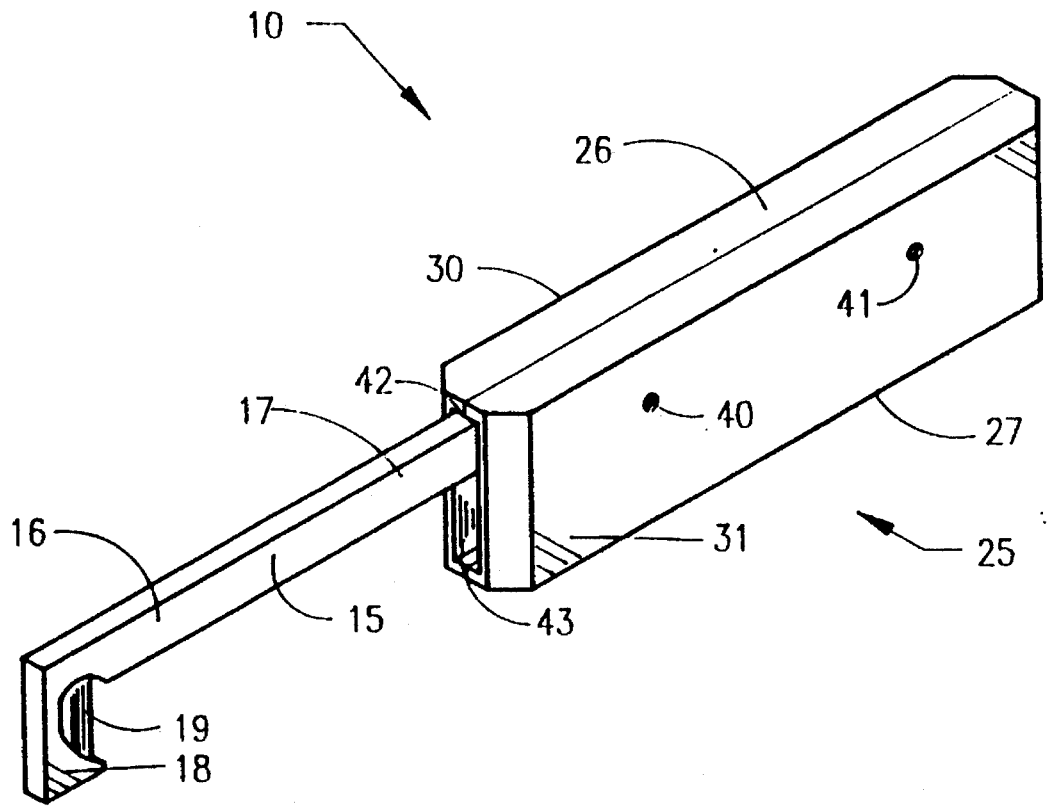
FIG. 1 is a perspective view of the pelvic splitter device showing the shaft extended from the impact and handle means.

Referring to the drawings in FIGS. 1 through 5, in particular, the pelvic splitter device 10 is illustrated as comprising a shaft 15 having a generally rectangular cross-section and having a hook member 18 at a forward end 16 thereof and further having a transverse hole 20 near a rearward end 17 thereof; and an impact and handle means 25 comprising two mirrored longitudinal half bodies 26 & 27 each having an attachable side 39 which mirrors the attachable side 39 of the other half body 26 or 27.

Figure 5:
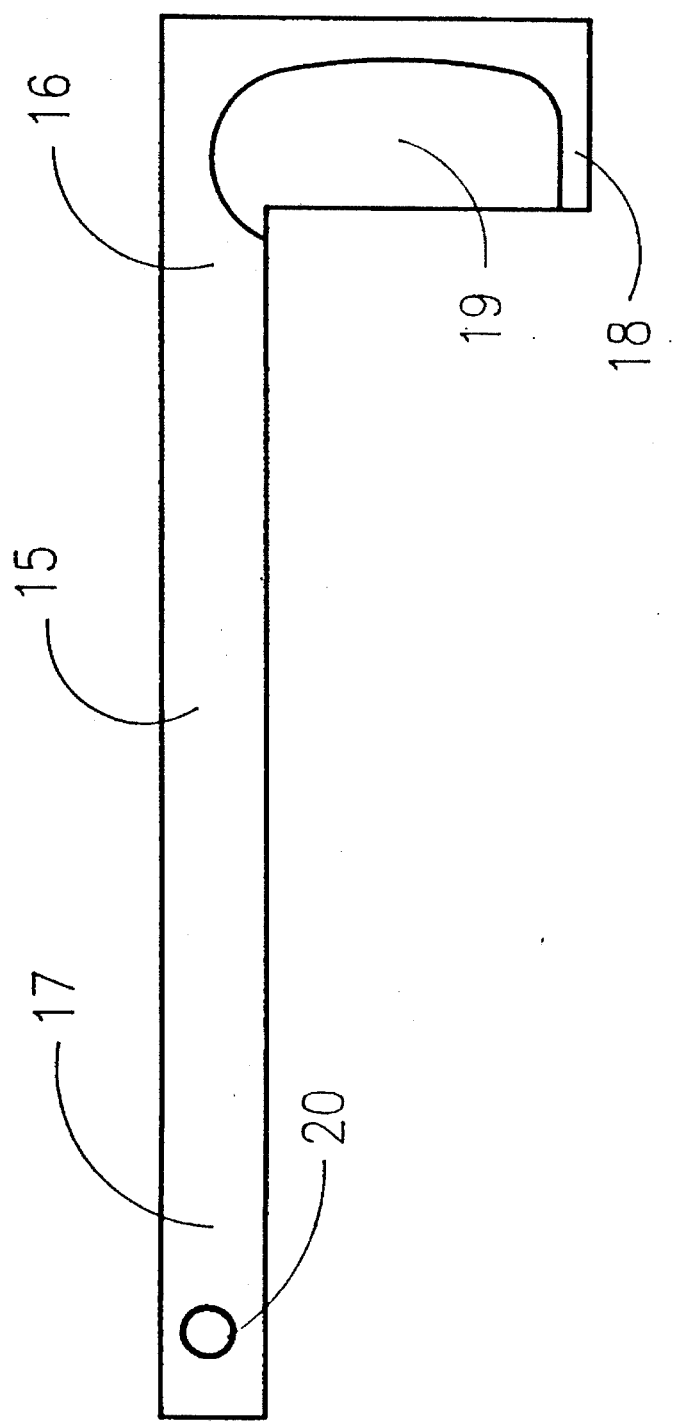
FIG. 5 is a side elevation view of the shaft of the pelvic splitter device.

As shown in FIGS. 1 and 5, the shaft 15 has a generally lateral rectangular cross-section and has a generally rectangular shaped forward end 16. A hook member 18 is integrally formed at the forward end 16 and has a rearwardly facing knife edge 19 machined on the surface and inner edge of the hook member 18 for splitting the pelvises of game animals such as deer. The shaft 15 further has a transverse hole 20 extending through the side of the shaft 15 near the rearward end 17 thereof.

Figure 2:
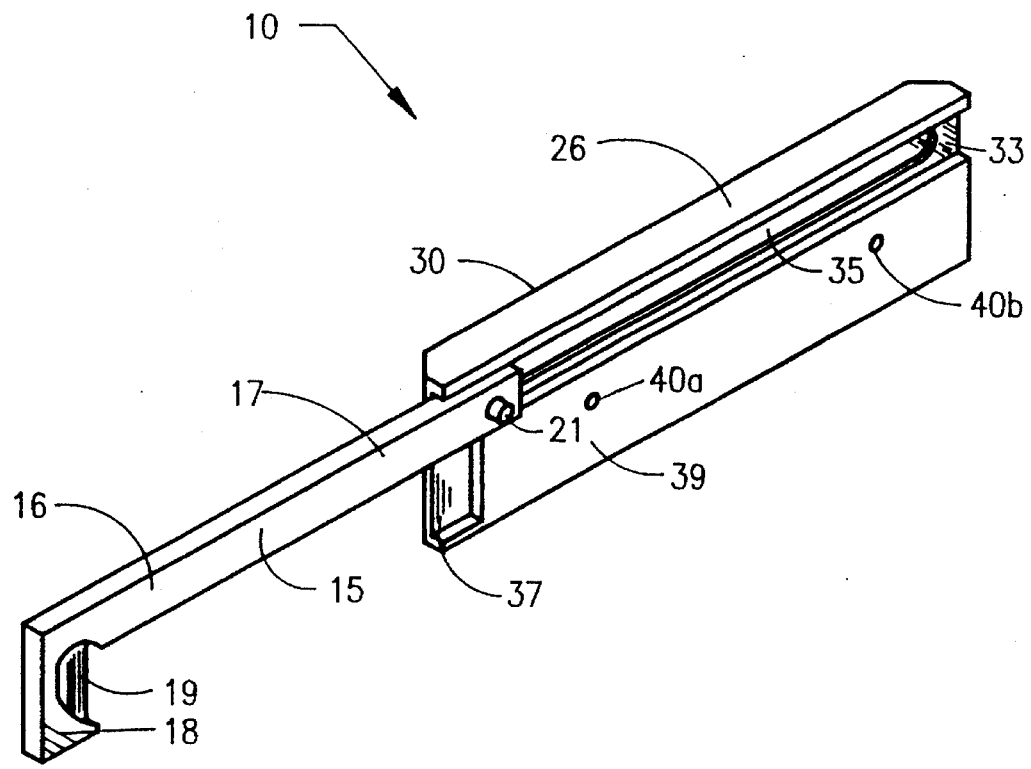
FIG. 2 is a perspective view of the pelvic splitter device showing, in particular, a longitudinal half body of the impact and handle means and showing the attachable side of one of the half body.
Figure 4:
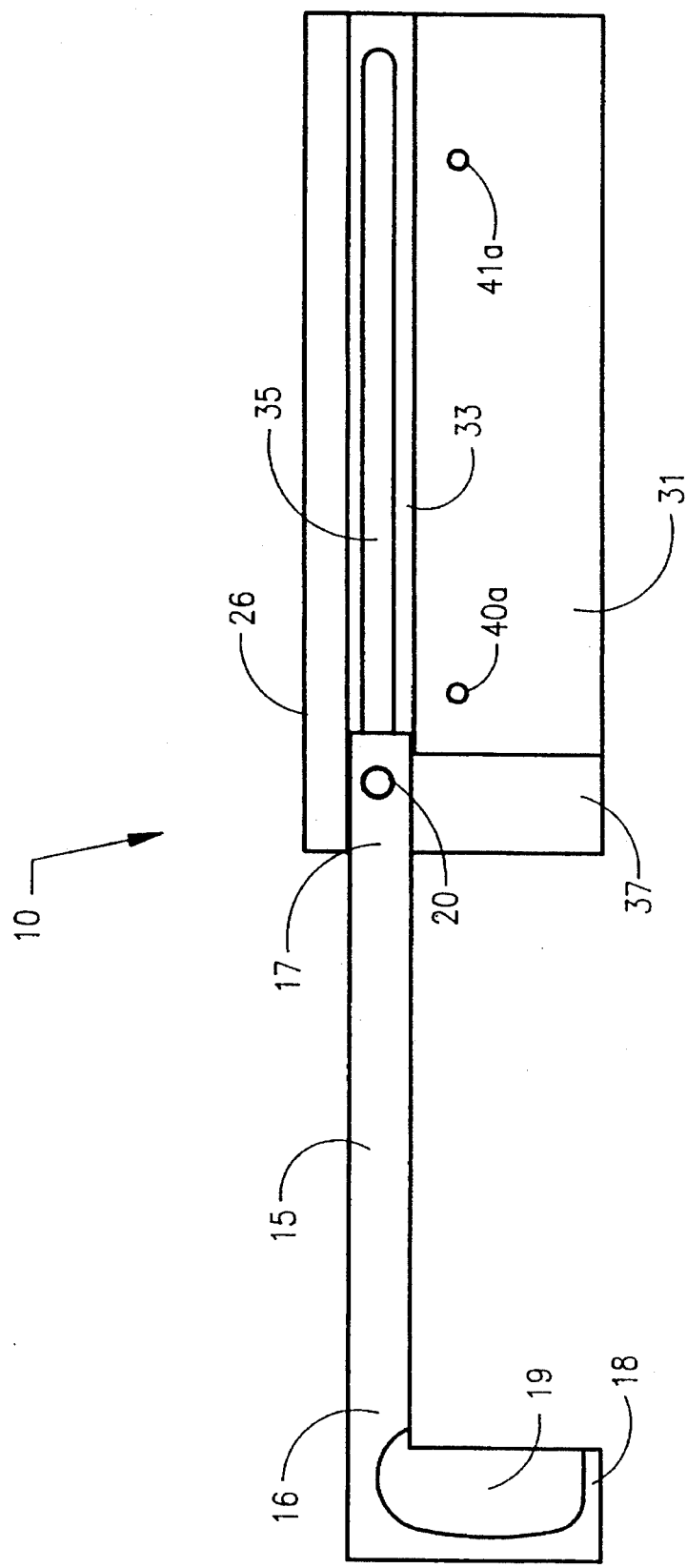
FIG. 4 is a cross-sectional side view of the impact and handle means and a side view of the shaft extended therefrom.

As shown in FIGS. 1 and 4, the impact and handle means 25 is slidably mounted about the shaft 15. The impact and handle means 25 has a pair of longitudinal half bodies 26 & 27 each having an outer side 30 or 31, a front end 28 or 29, a back end, and an attachable side 39 which generally mirrors the attachable side 39 of the other half body 26 or 27. The mirrored sides of the two longitudinal half bodies 26 & 27 each have a longitudinal recess 33 extending along the upper portion of the side from the front end 28 or 29 thereof to near the back end thereof. As shown in FIG. 2, a longitudinal groove 35 extends in the longitudinal recess 33 of each half body 26 or 27 and coaxially extends for much of the length of the longitudinal recess 33 from near the front end 28 or 29 to near the back end of the half body 26 or 27. Each longitudinal groove 35 has a closed front end. A recessed portion 37 extends in the attachable side 39 of each of the half bodies 26 & 27 along the lower portion and at the front end 28 or 29 thereof.

To assemble the impact and handle means 25 and the splitter device 10, the rearward end 17 of the shaft 15 is slidably positioned in the longitudinal recesses 33 of the two half bodies 26 & 27 with the hook member 18 being turned downward generally in a plane parallel to the surfaces of the attachable sides 39 of the half bodies 26 & 27 with the attachable sides 39 of the half bodies 26 & 27 facing one another. A retainer 21 such as a pin is inserted through the transverse hole 20 in the shaft 15 with the ends of the retainer 21 slidably inserted in the longitudinal grooves 35 of the two half bodies. The two half bodies 26 & 27 are fastened together at their attachable sides 39 with a pair of screws 40 & 41 spaced apart and turned in through the sides of the half bodies 26 & 27. The two longitudinal recesses 33 in the attachable sides of the two half bodies 26 & 27 when the impact and handle means 25 is assembled defines a substantially lateral rectangular cross-sectional bore 42 dimensioned for slidably receiving the shaft 15. The rectangular cross-sectional bore 42 having four corners and being shaped and dimensioned similar to the shaft 15 prevents the impact and handle means 25 from rotating about the shaft 15. The user can angle the knife edge 19 on the shaft 15 by rotating the impact and handle means 25 which rotates the shaft 15 because the shaft 15 cannot turn inside the bore 42. The two recessed portions 37 in the attachable sides 39 of the two half bodies 26 & 27 when the impact and handle means 25 is assembled defines a substantially lateral rectangular cross-sectional slot 43 dimensioned to receive the hook member 18 of the shaft 15 to store the hook member 18 and the knife edge 19 such that the forward end 16 of the shaft 15 is substantially flush with the front ends 28 & 29 of the two half bodies 26 & 27 when the shaft 15 is retracted entirely within the impact and handle means 25.

Figure 3:
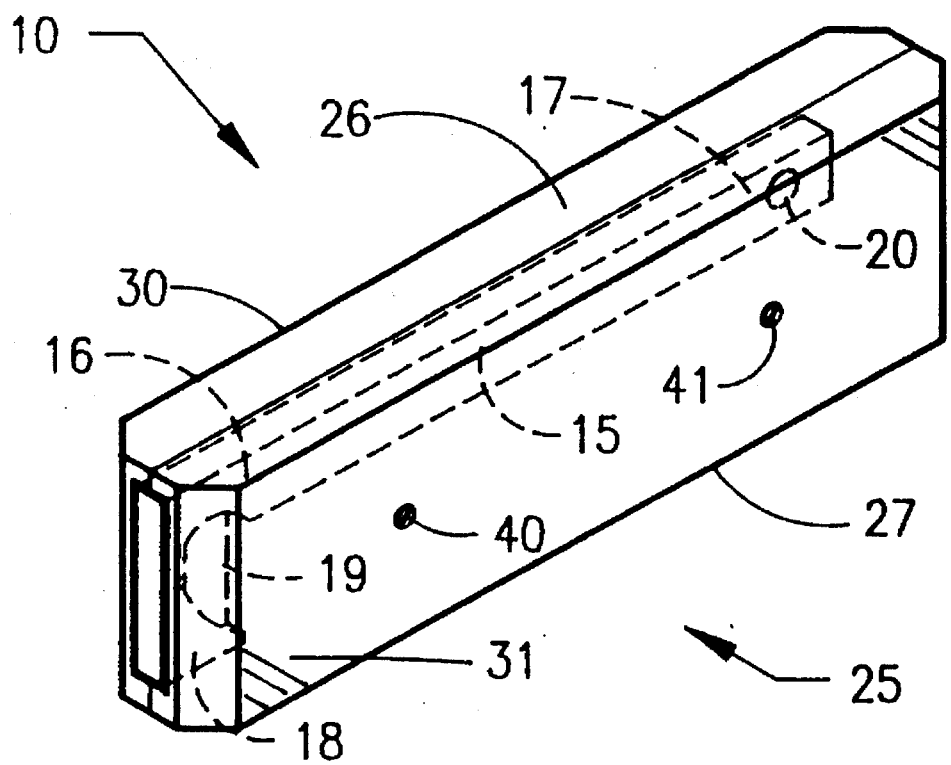
FIG. 3 is a perspective view of the pelvic splitter device showing, in particular, a hidden view of the shaft retracted entirely within the impact and handle means.

As shown in FIGS. 1, 3 and 4, the impact and handle means 25 slides upon the shaft 15 to function as a slide hammer to urge the hook member 18 and knife edge 19 through and split the pelvis of a game animal such as a deer. The retainer 21 functions as an abutment to the closed front ends of the longitudinal grooves 35 when the impact and handle means 25 is forcible moved rearwardly along the shaft 15 to urge the knife edge 19 through the pelvis of the animal.

To use the pelvic splitter device 10 to split the pelvic bone of an animal, the user urges the forward end 16 of the shaft 15 to push the bladder and urethra of the animal away from the pelvic bone without puncturing either of them and inserts the hook member 18 of the pelvic splitter device 10 in behind the pelvic bone between the bladder and pelvic bone to engage the knife edge 19 to the pelvic bone. The user then grasps the impact and handle means 25 with his/her hand and slides the impact and handle means 25 towards the forward end 16 of the shaft 15 which also slides the retainer 21 holding the shaft 15 in the longitudinal grooves 35 of the two half bodies 26 & 27 towards the back ends of the two half bodies. To split through the pelvic bone of the animal, the user forcibly slides the impact and handle means 25 rearwardly along the shaft 15 to impact the retainer 21 with the closed front ends of the longitudinal grooves 35 thus urging the knife edge 19 rearwardly through the pelvic bone. The user repeatedly slides the impact and handle means 25 back and forth upon the shaft 15 to impact the retainer 21 until the knife edge 19 splits the pelvic bone of the animal. The user can position and angle the knife edge 19 by turning and rotating the impact and handle means 25 as desired by the user.

Various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A pelvic splitter device comprising:

a shaft having a forward end and rearward end, said shaft further having a hook member at said forward end, said hook member having a knife edge facing rearwardly for splitting pelvises on animals; and an impact and handle means freely slidably mounted upon said shaft and having unrestricted movement between the forward and rearward ends of said shaft;

a retainer extending outward from said shaft near said rearward end thereof for slidably retaining said shaft within said impact and handle means; said retainer providing an abutment for said impact and handle means to slidably ram against when said impact and handle means is moved to an extreme position away from said hook member for urging the hook member through the pelvic bone of an animal;

said impact and handle means dimensioned and adapted such that said shaft and hook member are retractable and storable within said impact and handle means when not being used.

2. A pelvic splitter device as described in claim 1, wherein said impact and handle means further comprises two half bodies fastenable together, said half bodies each having a front end, back end, an attachable side, and an outer side, said attachable side of one half body mirrors said attachable side of said other half body.

3. A pelvic splitter device as described in claim 2, wherein said attachable sides of said half bodies each have a longitudinal recess extending through said front end thereof and extending towards said back end thereof for slidably receiving said shaft.

4. A pelvic splitter device as described in claim 3, wherein said attachable sides of said half bodies each have a longitudinal groove extending coaxially in said longitudinal recess, each said longitudinal groove having a closed front end.

5. A pelvic splitter device as described in claim 4, wherein said attachable sides of said half bodies each have a recessed portion at said front end thereof, said recessed portion dimensioned to received and store said hook member within said impact and handle means.

6. A pelvic splitter device as described in claim 3, wherein said longitudinal recesses define a longitudinal bore through said impact and handle means when said half bodies are assembled together, for slidably receiving said shaft.

7. A pelvic splitter device as described in claim 5, wherein said recessed portions of said half bodies define a slot when said half bodies are assembled together, said slot dimensioned for receiving and storing said hook member within said impact and handle means when said splitter not being used.

8. A pelvic splitter device as described in claim 4, wherein said retainer is slidably mounted within said longitudinal grooves in said half bodies to slidably ram against.

9. A pelvic splitter device as described in claim 1, wherein said shaft and said bore have corresponding multiple sides so that said shaft rotates in relationship to the rotation of said impact and handle means to position said knife edge as desired by a user.

10. A method of splitting the pelvis of an animal, which comprises:

providing a shaft having a hook member and knife edge at a forward end thereof and providing an impact and handle means slidable on said shaft, said shaft having a retainer slidably mounted within said impact and handle means;

inserting said forward end of said shaft between a bladder, and pelvic bone of said animal;

aligning said knife edge with said pelvic bone of said animal;

sliding said impact and handle means toward said forward end of said shaft;

forcibly sliding said impact and handle means away from said hook member and impacting said retainer to urge said knife edge through said pelvic bone; and repeatedly sliding said impact and handle means back and forth upon said shaft and impacting said retainer until said splitter splits said pelvic bone of said animal.

* * * * *